United States Patent [19]

Foote

[11] 4,253,824

[45] Mar. 3, 1981

[54] TRAMP REMOVAL AND BED RECIRCULATION SYSTEM

[75] Inventor: Jerry B. Foote, Spokane, Wash.

[73] Assignee: Energy Products of Idaho, Coeur d'Alene, Id.

[21] Appl. No.: 57,479

[22] Filed: Jul. 13, 1979

[51] Int. Cl.³ ............................................. F27B 15/00
[52] U.S. Cl. .................................... 432/58; 34/57 A; 406/91; 432/239
[58] Field of Search .................... 432/15, 58, 239; 110/245; 34/57 A, 57 B; 406/91; 193/2 R

[56] References Cited

U.S. PATENT DOCUMENTS

| | | | |
|---|---|---|---|
| 2,690,962 | 10/1954 | Clarke | 34/57 A |
| 2,836,902 | 6/1958 | North | 34/57 A |
| 2,876,079 | 3/1959 | Upchurch et al. | 34/57 A |
| 3,136,531 | 6/1964 | Wesselingh | 34/57 A |
| 3,237,812 | 3/1966 | Kemp | 406/91 |
| 4,177,742 | 12/1979 | Uemura et al. | 110/245 |

*Primary Examiner*—Henry C. Yuen
*Attorney, Agent, or Firm*—Lynn G. Foster

[57] ABSTRACT

A fluidized bed vessel tramp removal and bed recirculation system comprising a novel dual cone apparatus at the bottom of the vessel.

5 Claims, 5 Drawing Figures

U.S. Patent    Mar. 3, 1981    4,253,824
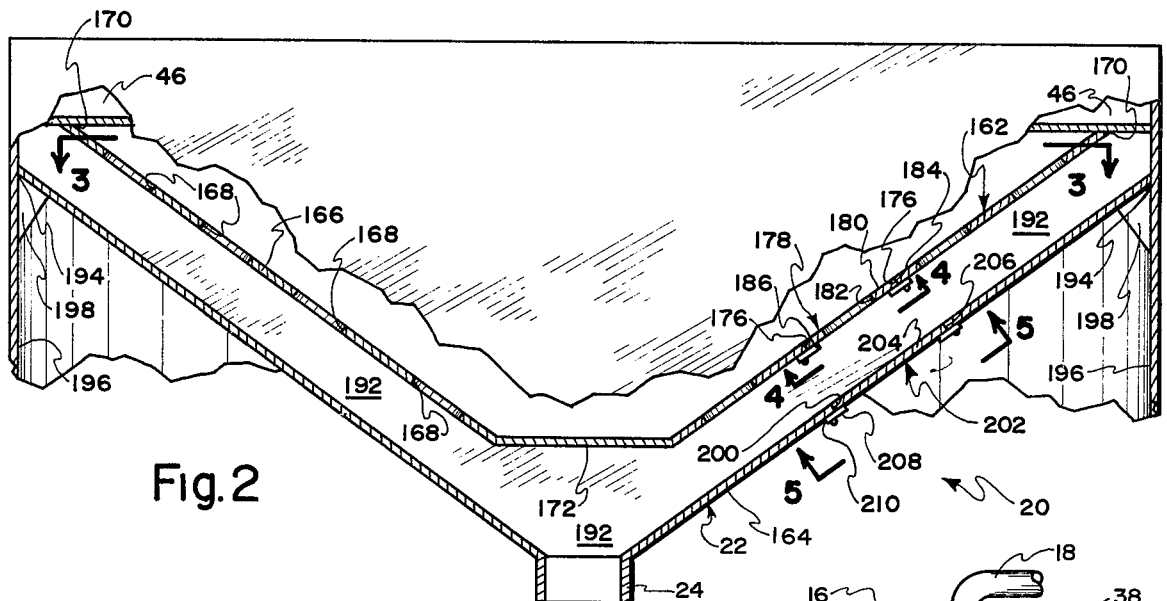
Fig. 2
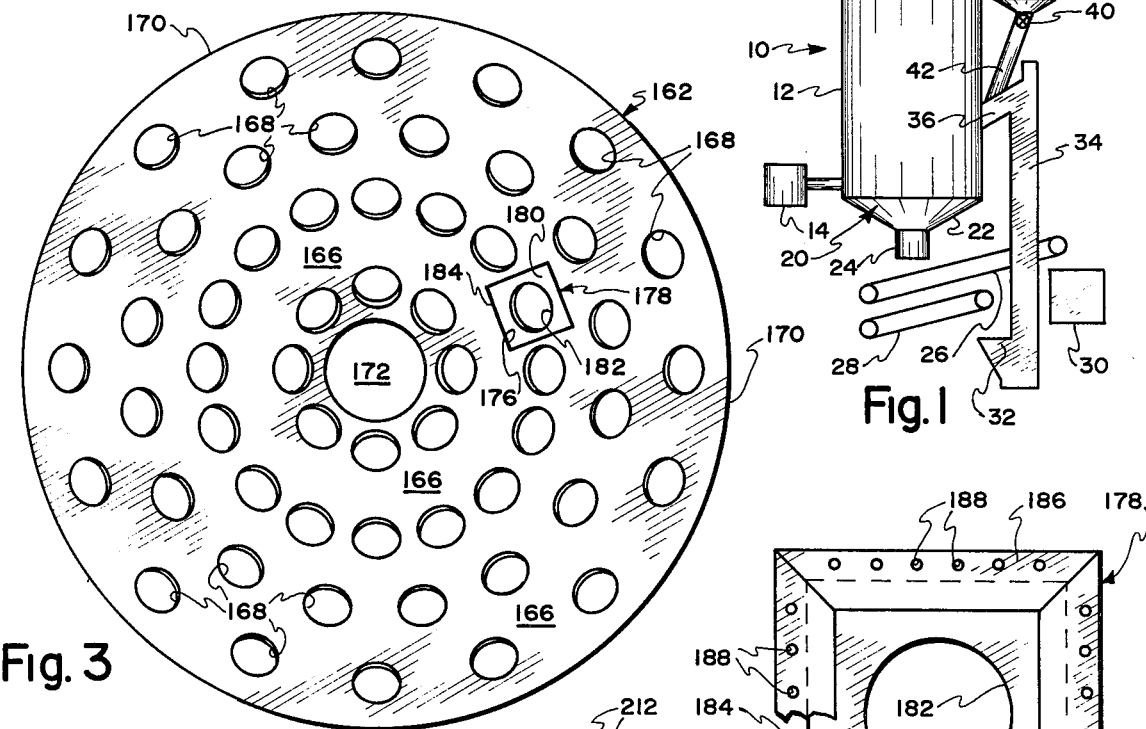
Fig. 3
Fig. 1
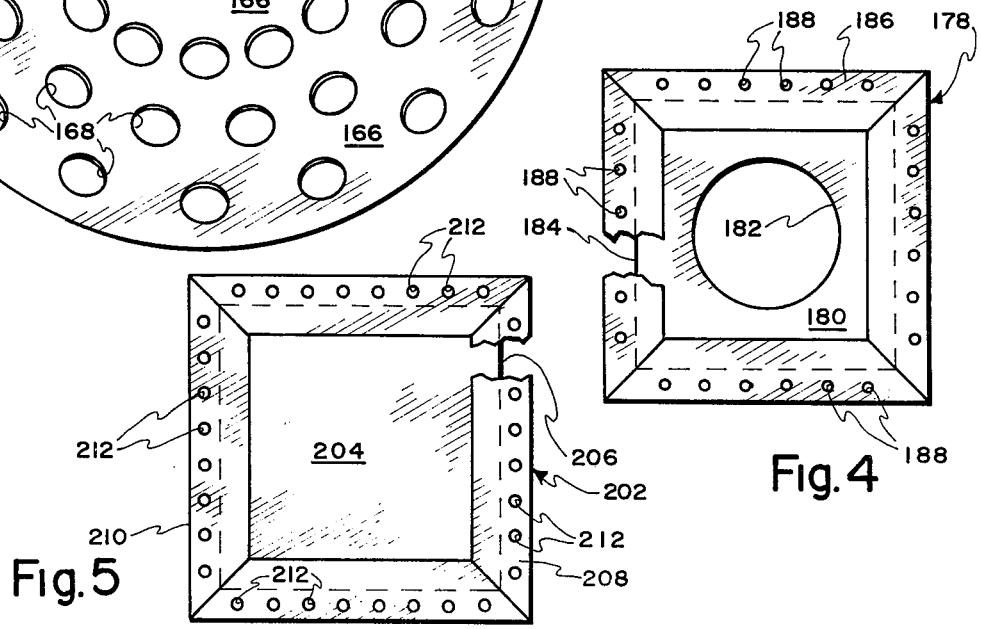
Fig. 4
Fig. 5

TRAMP REMOVAL AND BED RECIRCULATION SYSTEM

BACKGROUND

1. Field of Invention

The present invention relates generally to the handling of granular material and more particularly to a novel fluidized bed tramp removal and bed recirculation system.

2. Prior Art

Prior fluidized bed tramp removal systems have been expensive, have normally required vibration inducing equipment and have failed to cause uniform flow of bed and/or tramp materials across the diameter of the vessel.

BRIEF SUMMARY AND OBJECTS OF THE INVENTION

In brief summary, the present invention comprises a fluidized bed vessel tramp removal and bed recirculation system, including method and apparatus, featuring a dual cone arrangement disposed at the bottom of the vessel, the capacity of which relates also to granular unloading per se.

It is a significant object to provide a novel tramp material removal system for a fluidized bed, including method and apparatus.

Another primary object is the provision of a novel system, including method and apparatus, for unloading granular material from storage.

A further important object is the provision of a unique method and apparatus for recirculating fluidized bed material.

These and other objects and features of the present invention will be apparent from the detailed description taken with reference to the accompanying drawings.

BRIEF DESCRIPTION OF THE DRAWINGS

FIG. 1 is a schematic of a fluidized bed vessel having a bed recirculation system;

FIG. 2 is a cross section of a static dual cone tramp material removal and bed recirculation apparatus according to the present invention disposed at the bottom of a fluidized bed vessel;

FIG. 3 is a plan view of the removal apparatus taken along line 3—3 of FIG. 2;

FIG. 4 is a view of the inner cone access panel taken along line 4—4 of FIG. 2; and FIG. 5 is a view of the outer cone access panel taken along line 5—5 of FIG. 2.

DETAILED DESCRIPTION OF THE ILLUSTRATED EMBODIMENT

Reference is now made to the drawings wherein like numerals are used to designate like parts throughout. While it is to be appreciated that the present invention has application to any one of several types of fluidized bed vessels, inter alia, one suitable fluidized bed vessel system, generally designated 10, is schematically illustrated in FIG. 1. System 10 comprises a vessel 12 having a fluidized bed interiorly disposed in the bottom thereof. The vessel 12 is illustrated as comprising a source 14 of heat and fluidizing air which is delivered to the fluidized bed as desired in any available fashion. The vessel 12 is also illustrated as comprising an inlet 16 for solid waste or the like and an off-gas discharge conduit 18. Although not shown, the off-gas may be processed in any known fashion to remove solid particles therefrom prior to release to the atmosphere. The present invention is not directed to off-gas processing gear and, therefore, no detailed explanation of such equipment is necessary.

The system 10 is also equipped with a tramp removal and bed recirculation apparatus 20 disposed at the lower end of the vessel 12. This is schematically illustrated as a downwardly converging exterior cone 22, a bed and tramp material discharge chute 24, a porous tramp removal conveyor 26, which permits the fine granular bed material to pass therethrough onto an impervious bed material conveyor 28 and delivers tramp material to a container 30 or the like.

The segregated bed material received and displaced by conveyor 28 is deposited by gravity in a hopper 32 and displaced by a vertical conveyor 34 to an elevated chute 36 along which the segregated, recirculated bed material moves to re-enter the vessel 12. A source 38 of new bed material is also provided. New bed material may be selectively introduced into the vessel 12 from source 38 across valve 40, and seriatim along conduit 42 and chute 36 to replace bed material lost through attrition, e.g. elutriation.

Reference is now made to FIGS. 2-5, which illustrate a novel fluidized bed tramp and bed material removal apparatus according to the present invention, which is generally designated 20. Apparatus 20 is disposed beneath the previously described fluidized bed vessel 12. The tramp and bed material removal apparatus 20 comprises an apertured inner cone, generally designated 162 and a solid outer cone, generally designated 164. Each cone is preferably fabricated of steel plate material.

The inner cone 162 thus comprises a thin metal wall 166 which is interrupted by a plurality of circular apertures 168 axially oriented normal to the plane containing the metal wall 166 in each case and spaced in arcuate rows with the apertures of some adjacent rows being off-set. Other aperture shapes and arrays can be used. The apertures, however, must be sized to pass the largest pieces of tramp or other material expected to be encountered.

The top of the inner cone 162 has a major diameter substantially the same as or slightly less than the interior diameter of the fluidized bed vessel 12, the inner cone 162 being illustrated as secured to the underside of a fluidizing air plenum 46 by welding or the like at arcuate sites 170 and otherwise as required. This suspends the inner cone 162 in the position illustrated in FIG. 2. The inner cone has a horizontally disposed annular bottom plate 172 which bridges between and is integral with the sloped cone shaped wall 166. Extraordinarily large pieces of tramp or other material, if any, of a size greater than apertures 168 come to rest here. The diameter of the flat bottom 172 constitutes the minor diameter of the inner cone 162 and is illustrated as being on the order of two and one-half times the diameter of the aligned tramp and bed effluent conduit 24 of the outer cone 22.

The inner cone 162 also comprises a generally rectangular access opening 176. This opening 176 constitutes an access port in the inner cone. During operation, the port 176 is substantially closed by an inner cone access panel 178. See FIG. 4. Access panel 178 comprises a thin sheet metal interior 180 interrupted by a central aperture 182 (which is sized, shaped and located similar to the previously described apertures 168 for the same purpose). The central plate 180 has a generally rectangular or square periphery 184 of substantially the same dimensions as opening 176 and thus fits snugly and flush within the opening 176. A mitred frame 186 is larger than and disposed about the periphery 184 of plate 180. Frame 186 thus extends uniformly a predetermined distance beyond the periphery 184. The mitred frame 186 comprises a plurality of apertures 188 through which cap screws are caused to pass and to be secured in the wall 166 of the inner cone 162 in a conventional manner, as illustrated in FIG. 3. The access panel 178 is retained in the assembled position illustrated in FIG. 2 during operation of the fluidized bed and in particular during use of the tramp removal apparatus 20. When the fluidized bed has cooled and the bed material removed, the access panel 178 may be removed for inspection, tramp removal and maintenance purposes.

The outer cone 22 comprises a sheet metal wall which is conical in configuration, having the same degree of taper as the inner cone 162 so that a substantially conical hollow chamber 192 of uniform thickness is caused to be situated between the two cones 162 and 22 in the assembled condition. The chamber 192 must be sized to pass the largest piece of tramp material which may enter any opening 168.

The upper edge of the wall 22 forming the outer cone 22 is annularly secured at site 194 to a metal cylindrical wall 196. Wall 196 constitutes a continuation of the bed vessel wall. A plurality of spaced gusset plates 198 are illustrated as being used to provide load transferring support and stability between the upper annular edge of the outer cone 164 (which constitutes the major diameter of the outer cone) and the cylindrical wall 196. Preferably each gusset plate 198 is securely and rigidly welded or otherwise suitably secured to both plates 22 and 196.

The plate wall 196 may be supported upon conventionally arranged structural members, concrete footings or columns or in any other suitable fashion.

An access opening 200 of rectangular configuration is provided in the wall 22 comprising the outer cone. The access opening 200 is preferably slightly larger than previously described access opening 176 in the inner cone 162, but is in alignment therewith. The rectangular opening 200 is entirely closed by an outer cone access panel 202. As can be seen from observation of FIG. 5, panel 202 comprises a solid square or rectangular sheet metal plate 204 having an outer perimeter edge 206. The perimeter 206 is selected to be substantially the same as the size of the opening 200 so that a snug edge-to-edge fit, is achieved in the assembled position. The access panel 202 further comprises an enlarged rectangular or square mitred border 208, the perimeter 210 of which is larger than the perimeter of the metal plate 206 and the opening 200 so that when properly installed the border 208 overlaps onto the sheet metal wall 190 of the outer cone 164. The border 208 is provided with a plurality of apertures 212 through which cap screws are caused to pass and be threadedly secured into the sheet metal wall 22, as illustrated in FIG. 2.

During use, the access panel 202 is at all times maintained in the installed, closed position of FIG. 2. However, when the fluidized bed and the tramp removal apparatus 20 is no longer in use and the bed material has been removed from the vessel followed by sufficient cooling time, the panels 202 and 178 may be sequentially removed to provide access to the interior of the apparatus 20 for inspection, tramp removal and maintenance purposes.

It has been found that use of the tramp and bed material removal invention embodied in apparatus 20 causes a substantially uniform flow of bed and tramp material downwardly across the entire diameter of the vessel, thereby providing a first in/first out system for the bed material which has application to unloading granular material per se from a storage vessel. The tramp and bed material does not tend to become trapped or isolated but migrates uniformly downwardly, engages the sloped surface of the metal wall 166 of the inner cone 162 and is caused to slide along the wall 166 and fall through the next opening 168, the openings 168 being arranged so that all downwardly migrating bed and tramp material will have a displacement path which intersects at least one of the apertures 168. Not only does the bed and tramp removal system 20 provide for homogenous and uniform displacement of the bed and tramp material but results in substantial cost savings due to the manner in which it is constructed together with the elimination of any requirement that the removal system be subjected to vibration or the like.

The bed and tramp materials caused to be expelled through effluent conduit 24 are segregated and processed, for example, as previously described. If desired, a valve may be placed in conduit 24 to prevent and/or control the flow of bed and tramp material from the vessel.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for removing tramp and bed material from a fluidized bed vessel comprising:
   a vessel having a fluidized bed in the lower portion thereof;
   means supplying fuel and causing the fuel to be disposed within the bed;
   means for distributing air within and displacing air upwardly through the bed;
   means by which the temperature of the bed is elevated to an operative level;
   the improvement comprising a bed and tramp material removal apparatus disposed below the air distributing and displacing means comprising first and second vertically spaced cone means defining a hollow generally conically shaped chamber therebetween;
   the first cone means comprising a downwardly converging cone-shaped wall which supports a substantial part of the weight of the bed in the vessel, the cone-shaped wall comprising an array of apertures sized to pass under force of gravity both bed and tramp material from the vessel into the chamber;
   the second cone means being disposed below the first cone means and the chamber and comprising a downwardly converging substantially uninterrupted cone-shaped wall and effluent conduit means at the low point of the wall in communication with the chamber by which the bed and tramp material is removed under force of gravity from the vessel;

the cone-shaped chamber being hollow, substantially uninterrupted and sized to accommodate gravity displacement of bed and tramp material along the chamber between the first and second cone means to the conduit means.

2. A system according to claim 1 wherein the apertures in the wall of the first cone means are located to substantially uniformly intersect the flow paths of all portions of the bed and tramp material to create a substantially uniform rate of discharge across the entire cross section of the vessel.

3. A system according to claim 1 wherein the first and second cone means are statically supported in mentioned positions.

4. A system according to claim 1 wherein the first and second cone means are substantially parallel to each other.

5. A method of removing tramp and bed material from a fluidized bed vessel comprising:

providing a vessel having a fluidized bed in the lower portion thereof;

supplying fuel and causing the fuel to be disposed within the bed;

distributing air within and displacing air upwardly through the bed;

elevating the temperature of the bed to an operative level;

causing bed and tramp material to be removed from the vessel by passing said material by force of gravity adjacent the sites where air is being distributed and displaced;

causing the path of the descending material to intersect a downwardly converging cone-shaped wall and to substantially pass through an array of apertures sized to accommodate passage of the bed and tramp material;

causing the passed material to engage a downwardly converging solid cone-shaped wall;

accommodating hour-glass gravity displacement of engaged bed and tramp material along a hollow chamber between the two cone-shaped walls and discharge of the material from an opening at the low point of the solid cone-shaped wall.

* * * * *